United States Patent [19]

Wittig

[11] 4,210,820
[45] Jul. 1, 1980

[54] OPEN CYCLE OCEAN THERMAL ENERGY CONVERSION SYSTEM STRUCTURE

[75] Inventor: J. Michael Wittig, West Goshen, Pa.

[73] Assignee: The United States of America as represented by the United States Department of Energy, Washington, D.C.

[21] Appl. No.: 934,575

[22] Filed: Aug. 17, 1978

[51] Int. Cl.² ............................................... F03G 7/04
[52] U.S. Cl. ..................................... 290/52; 290/1 R; 60/641
[58] Field of Search .................. 290/1, 2, 52; 60/641, 60/671

[56] References Cited

U.S. PATENT DOCUMENTS

| | | | |
|---|---|---|---|
| 3,995,160 | 11/1976 | Zener et al. | 290/1 R |
| 4,069,673 | 1/1978 | Lapeyre | 290/52 X |
| 4,083,189 | 4/1978 | Fetkouich | 60/641 |
| 4,087,975 | 5/1978 | Owens | 60/641 |

OTHER PUBLICATIONS

Andrew Nizery–"Study of the Possibility of the Utilization of Thermal Energy of the Sea and of Solar Energy," Bulletin de l'Institute Oceanographique, No. 906, Dec. 30, 1946.

*Primary Examiner*—Gene Z. Rubinson
*Assistant Examiner*—W. E. Duncanson, Jr.
*Attorney, Agent, or Firm*—J. W. Keen

[57] ABSTRACT

A generally mushroom-shaped, open cycle OTEC system and distilled water producer which has a skirt-conduit structure extending from the enlarged portion of the mushroom to the ocean. The enlarged part of the mushroom houses a toroidal casing flash evaporator which produces steam which expands through a vertical rotor turbine, partially situated in the center of the blossom portion and partially situated in the mushroom's stem portion. Upon expansion through the turbine, the motive steam enters a shell and tube condenser annularly disposed about the rotor axis and axially situated beneath the turbine in the stem portion. Relatively warm ocean water is circulated up through the radially outer skirt-conduit structure entering the evaporator through a radially outer portion thereof, flashing a portion thereof into motive steam, and draining the unflashed portion from the evaporator through a radially inner skirt-conduit structure. Relatively cold cooling water enters the annular condenser through the radially inner edge and travels radially outwardly into a channel situated along the radially outer edge of the condenser. The channel is also included in the radially inner skirt-conduit structure. The cooling water is segregated from the potable, motive steam condensate which can be used for human consumption or other processes requiring high purity water. The expansion energy of the motive steam is partially converted into rotational mechanical energy of the turbine rotor when the steam is expanded through the shaft attached blades. Such mechanical energy drives a generator also included in the enlarged mushroom portion for producing electrical energy. Such power generation equipment arrangement provides a compact power system from which additional benefits may be obtained by fabricating the enclosing equipment, housings and component casings from low density materials, such as prestressed concrete, to permit those casings and housings to also function as a floating support vessel.

22 Claims, 10 Drawing Figures

OPEN CYCLE OCEAN THERMAL ENERGY CONVERSION SYSTEM STRUCTURE

GOVERNMENT CONTRACT

This invention is believed to have been made or conceived in the course of, or under a contract with the United States Department of Energy identified as EG-77-03-1473.

CROSS-REFERENCE TO RELATED APPLICATIONS

This invention is related to an invention disclosed in the application of J. M. Wittig, Ser. No. 934,572, filed Aug. 17, 1978, and an invention disclosed in the application of J. M. Wittig and S. J. Jennings, Ser. No. 934,574, filed Aug. 17, 1978.

BACKGROUND OF THE INVENTION

1. Field of the Invention

This invention relates to open cycle, ocean thermal energy conversion systems, and more particularly, to a packaging arrangement for distributing the individual components thereof in a compact configuration.

2. Description of the Prior Art

Ocean thermal energy conversion is a process by which the normal temperature difference existing between relatively warm surface waters and relatively cold, subsurface waters is utilized to develop a pressure difference across a turbine through which a motive fluid is expanded. The surface of large water bodies, such as oceans, acts as a large solar energy collector for heating the exposed water. The solarly heated water, for open cycles, is partially flashed into steam which acts as the cycle's motive fluid or, for closed cycles, is used to heat a secondary fluid which acts as the cycle's motive fluid. The motive fluid's expansion through the turbine causes the turbine's rotor structure to rotate. A generator suitably coupled to the turbine's rotor rotates therewith and produces electrical energy. Due to the small temperature and pressure differences typically found in ocean thermal energy conversion cycles (30° F. and 0.3 psi by example), the cycle efficiencies are rather low. Since no fuel is consumed, the cost of operation for an ocean thermal energy conversion system is substantially reduced over conventional cycles and the primary factor limiting their use is the capital and construction costs of the equipment components. Components such as the turbine and heat exchangers must, by necessity, be very large to yield reasonable net electrical power output.

Ocean thermal energy conversion systems are typically classified to be of the open and closed cycle variety in which seawater and other volatile fluids are respectively utilized for the motive fluid. While the cycle varieties each have certain advantages over the other, a primary disadvantage of the open cycle OTEC system has been the high cost for materials and construction of the extremely large floating platform or hull structure required to support the power generation equipment. Reduction in the size and cost of the large platform structures required for open cycle OTEC power systems could provide a favorable advantage for such open cycles when compared with closed cycle OTEC systems. Platform size reduction may be accomplished by providing an optimum relative equipment disposition which allows functional integration of the equipment.

SUMMARY OF THE INVENTION

In accordance with the present invention, an improved configuration for the various equipment used in OTEC open cycles is provided for simultaneously reducing the size and cost of the platform/hull system structure necessary to support the power equipment and optimizing the thermodynamic performance of the power generation equipment. The invention generally comprises an axial flow turbine having a rotor with a vertical axis of rotation, a flash evaporator having a toroidal-shaped casing arranged about the turbine's axis of rotation to provide steam flashed from relatively warm ocean water to the turbine, a generator driven by the turbine's rotatable rotor, an annular condenser arranged about the turbine's axis of rotation constituting a series of tubes for segregating relatively cold ocean cooling water from the motive steam exhausting from the turbine into the condenser, and first and second propulsion means for respectively circulating relatively warm ocean water through the evaporator and relatively cold ocean cooling water through the condenser. Relatively warm ocean water is drawn up to the flash evaporator through a first skirt-conduit structure, which is substantially cylindrical in shape and extends from the flash evaporator's toroidal casing to a predetermined distance beneath the surface of the ocean. The first skirt-conduit provides structural support for the evaporator's casing and promotes nautical stability for the entire platform-hull structure. A second skirt-conduit structure is arranged radially within the first skirt and provides a drainage path for the unflashed ocean water and the heat laden cooling water respectively draining from the evaporator and condenser. The second skirt also provides an outer casing structure for the turbine and structural support for the evaporator, turbine, and other associated equipment.

Relatively cold ocean cooling water is supplied to the condenser through a conduit extending a substantial distance below the surface of the ocean. Such cooling water is supplied to an inlet manifold which distributes it in a generally radial manner through the condenser to the second skirt-conduit structure. Motive steam exhausted from the turbine is liquified into condensate within the condenser, and, when drained therefrom, is suitable for use as distilled water. Constructing the components of the present invention from prestressed concrete permits simultaneous utilization of the casings and skirts as the floating platform or hull system structure. Disposition of evaporator drain conduits in the second skirt-conduit/outer turbine casing retains the maximum possible heat content within the turbine so as to optimize its thermodynamic performance.

BRIEF DESCRIPTION OF THE DRAWINGS

The invention will be more fully understood from the following detailed description of a preferred embodiment, taken in connection with the accompanying drawings, in which.

DESCRIPTION OF THE PREFERRED EMBODIMENT

Figure 1:
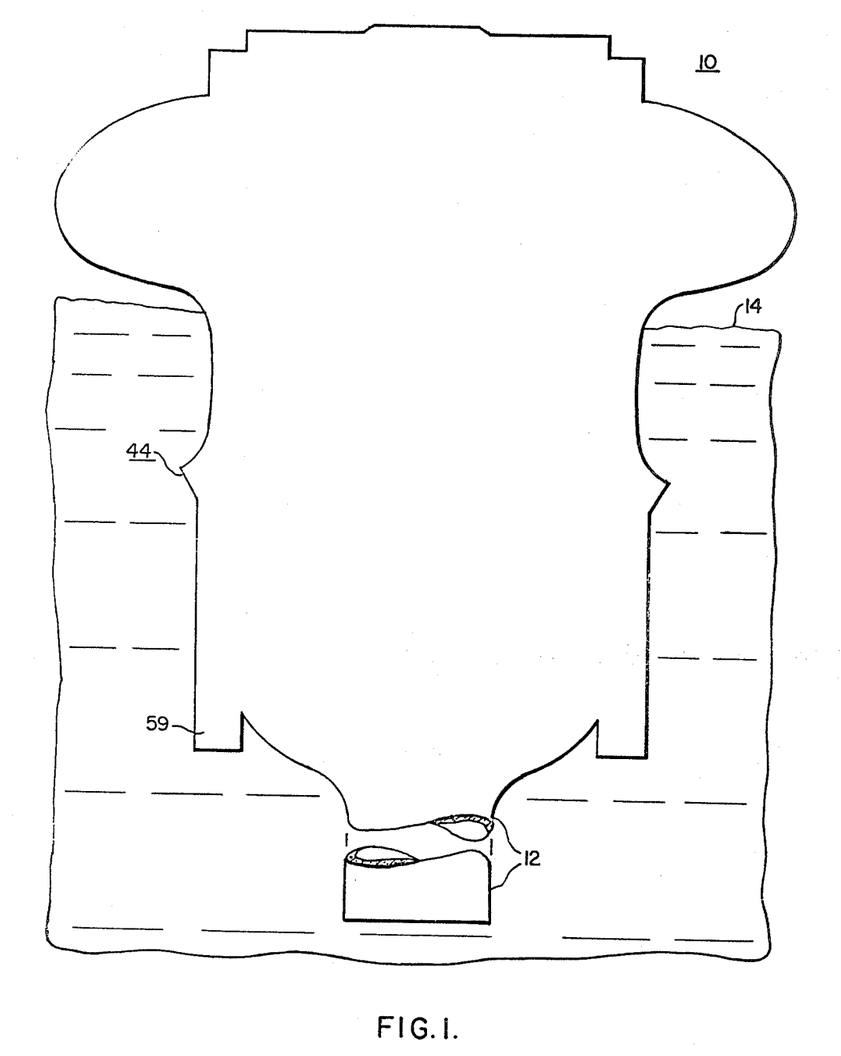
FIG. 1 is an elevation view of an open cycle OTEC system structure.

In FIG. 1 an OTEC open cycle system structure 10 is shown, disposed in operating position within a body of water such as an ocean with the illustrated representative submergence of the structure 10 within the ocean. Cold supply water conduit 12 is illustrated in a discontinuous manner since it extends approximately one thousand meters below the ocean's surface which is indicated by reference numeral 14. Cold water conduit 12 preferably constitutes prestressed concrete and rubber sections which are respectively disposed near and away from ocean surface 14. Composite conduit 12 provides a high degree of nautical stability for the generally mushroom-shaped structure 10 by penetrating to such extreme ocean depths. In the description which follows, the equipment and system structure size will pertain to an exemplary 100 megawatt net electric system. It should be understood that, however, this same system structure/packaging configuration can be utilized with different sized components or that multiple structures having the following description can, by utilizing a modular approach, be integrated into a larger overall electrical generation-water production system. Utilizing prestressed concrete for the OTEC system structure 10 enables elimination of a separate supporting platform since the prestressed concrete structure 10 simultaneously provides outer casings for the system's components and functions as a flotation device for maintaining system buoyancy within the body of water. While other materials can be utilized to form the system structure 10 and still obtain a high density power enclosure system of 3,667 cubic meters per megawatt net electric output, prestressed concrete is favored for its dual utility (containment and buoyancy) and its low material and fabrication costs.

Figure 2A:
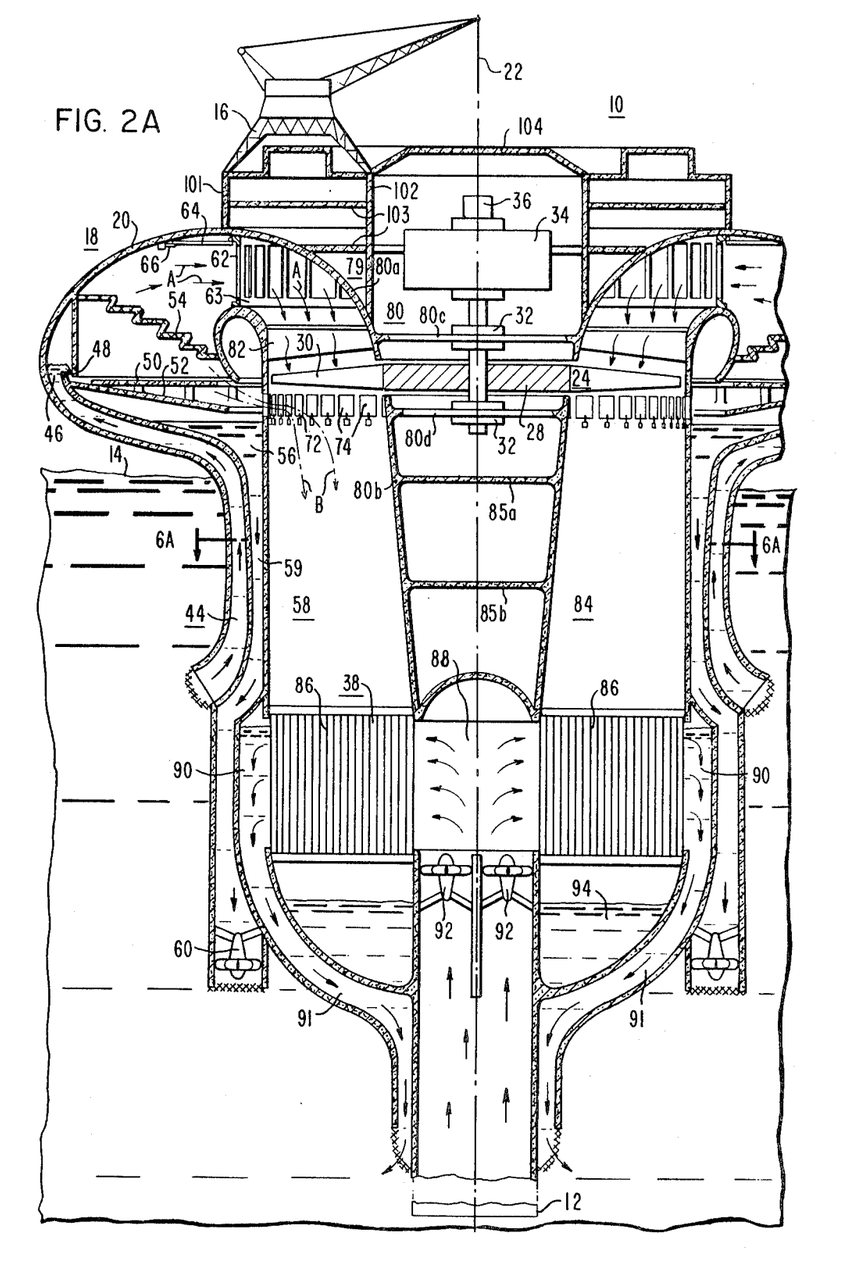
FIGS. 2A and 2B are sectional views of FIG. 1 illustrating alternate condenser tube arrangements.

FIG. 2A is a sectional view of FIG. 1. Schematic crane 16 is supported by system structure 10 and illustrates typical equipment installation and/or removal positions therefor. Flash evaporator 18 has an outer casing 20 which generally constitutes a toroidal surface. Toroidal casing 20 is radially disposed about vertical axis 22. Axial flow steam turbine 24 has a rotor structure which includes a vertical shaft 26 whose axis of rotation is substantially coincident with vertical axis 22. The rotor structure additionally includes disc portion 28 and blades 30 which preferably constitute wound fiberglass filament. Disc 28 surrounds shaft 26 and provides support for blades 30, which are attached to the radially outer periphery thereof. Disc 28 is, by example, approximately 32.7 meters in diameter and is preferably fabricated as disclosed in A. Grijalba's commonly assigned copending patent application Ser. No. 918,125. Shaft 26 is, by example, rotatably supported by exemplary 30 inch thrust bearings 32 and is coupled to drive generator 34 and exciter 36 to produce, when rotated, electrical energy. Condenser 38 is annularly disposed about vertical axis 22 and is arranged to condense motive steam exhausting from blades 30.

Figure 4:
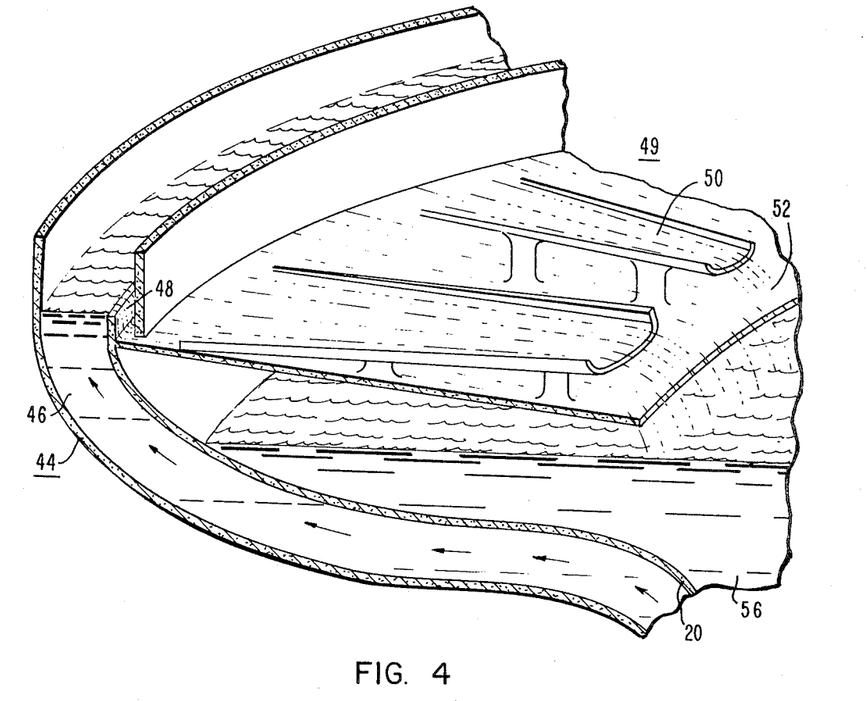
FIG. 4 is a pictorial illustration of a portion of the evaporator illustrated in FIGS. 2A and 2B.

Relatively warm ocean surface water is drawn through radially outer skirt-conduit structure 44 from a depth of approximately thirty meters through inlet opening 46 into a radially outer portion of evaporator 18's casing 20. The entering warm ocean water passes over weir 48 onto an evaporator tray structure 49 constituting two levels of evaporator trays 50 and 52, which are slightly slanted downward and radially inward. Approximately one-half to one percent of the warm ocean water passing over weir 48 flashes into steam and passes through stepped moisture separator or demister structure 54, while the remaining unflashed warm water flows radially inward and exits evaporator 18 through drain outlet 56 disposed through a radially inner portion of evaporator casing 20. Annular evaporator drain outlet 56 provides fluid access to a second skirt-conduit structure 58 which is circumferentially disposed about vertical axis 22 and includes outlet conduits 59 which transmit the warm water exiting drain outlet 56 to the ocean. FIG. 4 better illustrates outer skirt 44, weir 48, and the evaporator trays 50 and 52. Radially inward flow of the warm ocean water is imparted by weir 48 and associated evaporator tray structure 49 to minimize thermodynamic non-equilibrium and maximize steam-water separation.

At start-up time for the illustrated OTEC system, compressors evacuate evaporators 18 so as to cause relatively warm seawater to be drawn through conduits 44 and 59 into evaporator 18. Upon reaching the desired seawater level in evaporator 18 propulsion means such as pumps 60 begin to provide warm water circulation through evaporator 18. Pumps 60 are illustrated within outlet conduits 59 rather than in the inlet skirt conduits 44 to take advantage of the Barometric level Principle in supplying minimum pumping power for the exemplary flow rate of 343 tons of water per second.

After passing through demisters 54, the steam flows in a curved path, generally radially inward, as represented by stream lines A and passes through control port's 62 in cylindrical control wall 63. Control wall 63 preferably extends between evaporator casing 20 and skirt-conduit structure 58. A plurality of such ports 62 and mateable control doors 64 are disposed circumferentially about vertical axis 22 within evaporator 18. During normal operation of the exemplary OTEC equipment, hinged control doors 64 are maintained in the illustrated, open position by extending locking pins 66 under the open doors 64 to obstruct closure thereof. When, however, a turbine overspeed or other abnormal operating condition occurs, control pins 66 are retracted, allowing control doors 64 to close and obstruct ports 62 so as to prevent motive steam from entering turbine 24. Turbine access control door 64 is better illustrated in the operating position in FIG. 5A. Control pin 66 may be actuated to the releasing position by any suitable method when one of the aforementioned abnormal conditions is detected. To avoid upsetting normal flow equilibrium between evaporator 18 and condenser 38, steam produced within evaporator 18 is bypassed to the condenser 38 around turbine 24. Bypass steam flow, under such conditions, generally follows the path indicated by stream lines B in passing through a plurality of bypass ports 70 in skirt-conduit 58. Retraction of control pins 72 allow the normal pressure differential between the evaporator and condenser to swing open hinged bypass control doors 74. Control pins 72 are preferably actuatable prior to control pins 66 to decrease the impact with which turbine access control doors 64 close. Turbine bypass control doors 74 are shown in the normal, closed operational configuration, but can be seen in the open, bypassing state in FIG. 5B.

Figure 5A:
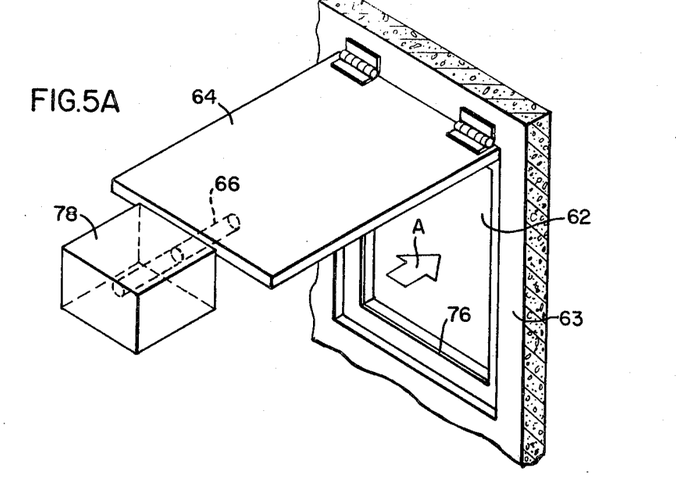
FIGS. 5A, 5B, and 5C illustrate control doors for diverting steam away to or away from the system turbine.
Figures 5B, 5C:
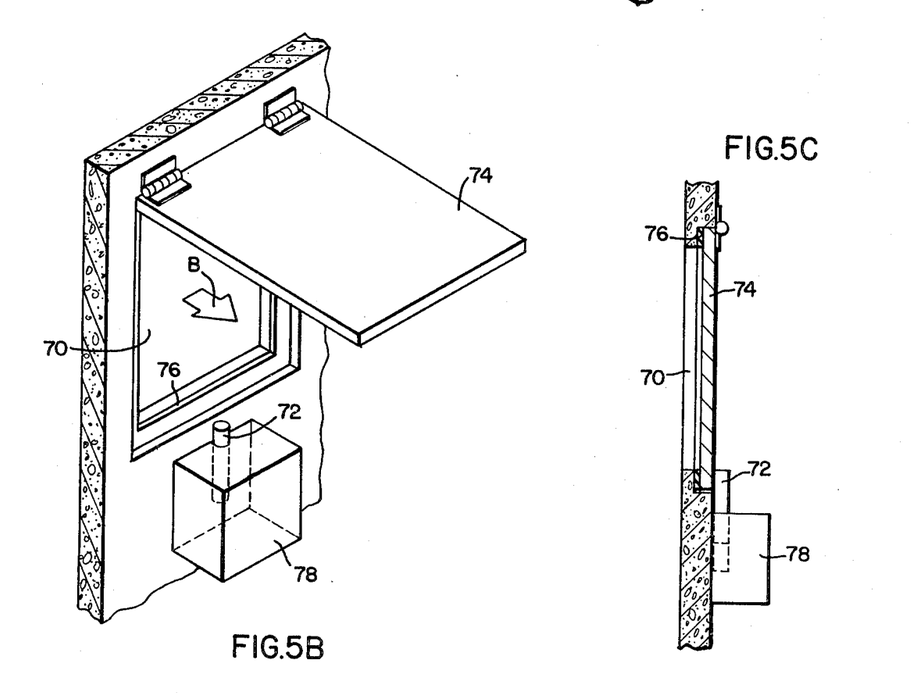

Sealing between access control doors 64 and control wall 63 and between bypass control doors 74 and the radially inner wall of skirt-conduit 58 is facilitated by interposing gaskets 76 therebetween as best illustrated in FIG. 5C. Control pins 66 and 72 are extended and retracted between obstructing and non-obstructing door positions, preferably by fast actuating means, such as electro-magnetic solenoid 78, as shown in FIGS. 5A, 5B, and 5C. During normal operation, steam following stream lines A passes into turbine inlet structure 79 through inlet ports 62 in wall 63. Skirt-conduit structure 58 provides turbine 24 with a cylindrical outer casing. A tapered inner casing structure 80 for turbine 24 includes portions 80a and 80b disposed upstream and downstream respectively of disc 28. The outer periphery of disc 28 and the base or platform of blades 30 cooperate with upstream and downstream inner casing portions 80a and 80b to provide a downwardly, radially inwardly tapered surface. The inner and outer casings therebetween define an annular motive steam flow path of increasing flow area in the downward axial direction. Turbine 24's steam inlet structure 79 receives steam from inlet ports 62 and includes radially inner wall 80a which redirects steam stream lines A from a substantially radial direction to an axial direction. Prior to entering rotatable blades 30, the motive steam passes through stationary stator vanes 82 which impart a suitable flow direction thereto compatible with entry into rotatable blades 30. After expansion through rotatable blades 30, the motive steam is exhausted through steam outlet structure 84 which includes skirt-conduit/outer casing 58 and inner casing portion 80b. Due to the diverging annular steam flow path through outlet structure 84, diffusion of the steam flow obtains resulting in a slowing of the exhausted steam and a partial conversion of its dynamic pressure into static pressure prior to its entry into condenser 38. Steam outlet structure 84 also includes inner, transverse decks, 85a and 85b which preferably house the previously mentioned evacuation compressors and other auxiliary equipment. Transverse decks 85a and 85b also provide lateral support for inner casing portion 80b since it is subjected to a vacuum on its radially outer side and substantially atmospheric pressure on its radially inner side. Inner casing portions 80a and 80b respectively include substantially circular walls 80c and 80d which are disposed on opposite axial sides of disc 28 and house bearings 32 which rotatably support shaft 26.

Figure 2B:
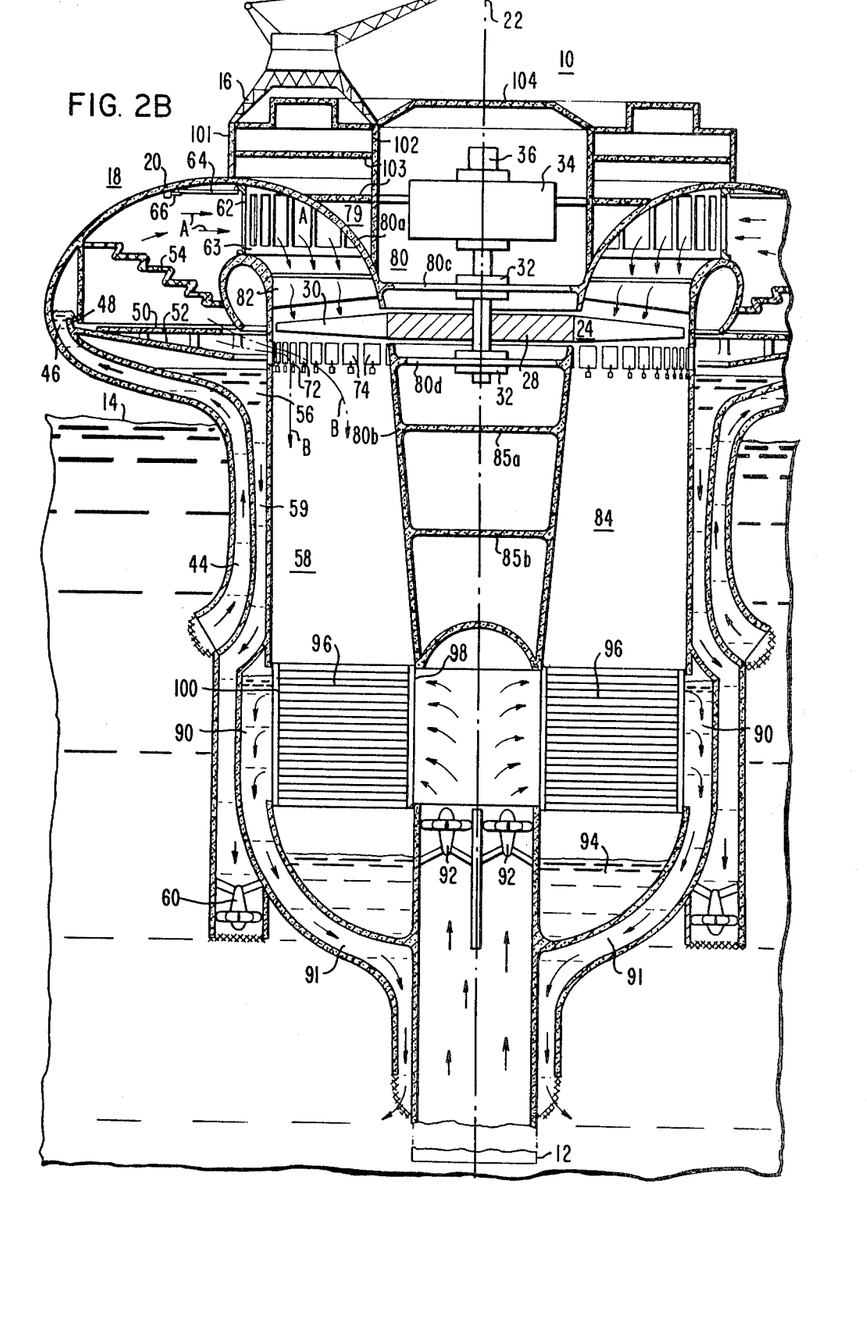

FIGS. 2A and 2B illustrate alternate embodiments for condenser 38. FIG. 2A illustrates vertical tubes 86 through which the motive steam travels and within which it is condensed by radially flowing cooling water which is segregated from the steam on the exterior of the tubes. For illustration purposes the cooling water's stream lines generally follow the paths indicated as C. The cooling water constitutes relatively cold ocean water which is drawn from depths of approximately 800 to 1,000 meters and is supplied to radially inner inlet manifold 88 through conduit 12. Cooling water flows radially outward through condenser 38 and across the exterior of tubes 86, absorbing heat and causing the motive steam to condense on the interior of tubes 86. At the radially outer edge of annular condenser 38 the heat laden cooling water passes through outlet manifold 90 into drain channel 91 both of which are included within inner skirt-conduit structure 58. The heat laden cooling water is transmitted axially downward in drain channel 91 back to the ocean by propulsion means such as pumps 92. Condensate from the motive steam drains vertically downward on the interior of tubes 86 into condensate sump 94, where it is collected for subsequent distribution.

Figure 6A:
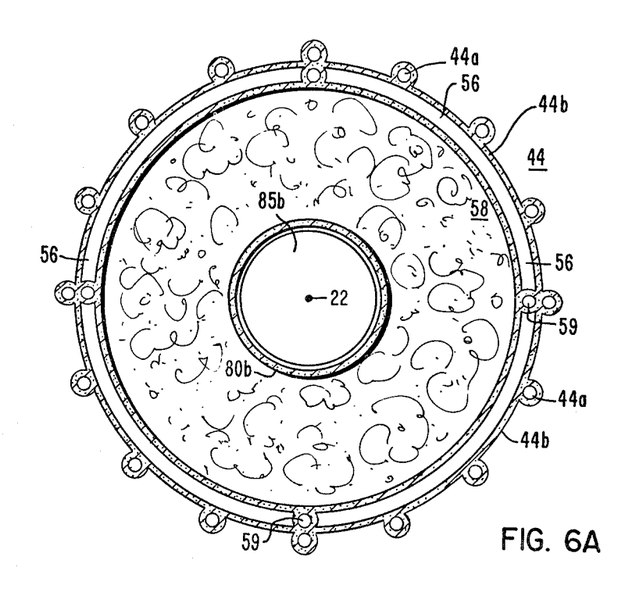
FIGS. 6A and 6B illustrate alternate plan views of an outer skirt-conduit.
Figure 6B:
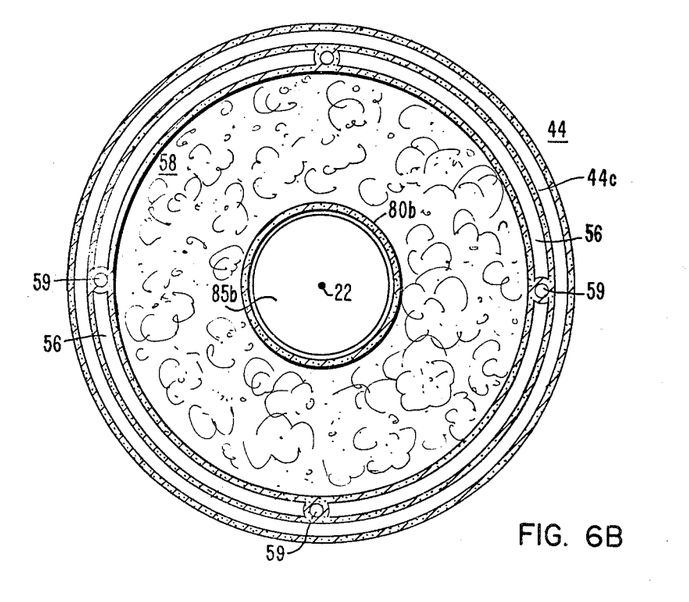

Radially outer skirt-conduit structure 44 preferably constitutes sixteen conduits 44a substantially uniformly distributed about axis 22 and a skirt member 94b which connects the included conduits. An alternate embodiment for the skirt-conduit structure includes an annular conduit 44c which also extends circumferentially about axis 22. The preferable and alternate skirt-conduit structures 44 are respectively illustrated in FIGS. 6A and 6B which are partial sectional views of FIG. 2A. Evaporator drain outlet 56 constitutes an annular channel which feeds, by example, four evaporator outlet conduits 59. Condenser drain channel 91, best shown in FIGS. 2A and 2B, preferably constitutes an annular passageway comprising part of the skirt-conduit structure 58 and is circumferentially disposed about axis 22 radially within evaporator drain outlet conduits 59. The radially inner wall of skirt-conduit 59 is seen to provide the radially outer casing of turbine 24.

FIG. 2B illustrates condenser 38 as having horizontal tubes 96, which extend through radially inner tube sheets 98 and radially outer tube sheets 100. In such configuration cooling water retains the flow pattern indicated in FIG. 2A by stream lines C, but now passes through the interior of tubes 96, causing motive steam exhausted into condenser 38 to be condensed on the exterior of tubes 96. The resulting condensate drains into annular sump 94 in a similar manner to the embodiment of FIG. 2A.

Figure 3:
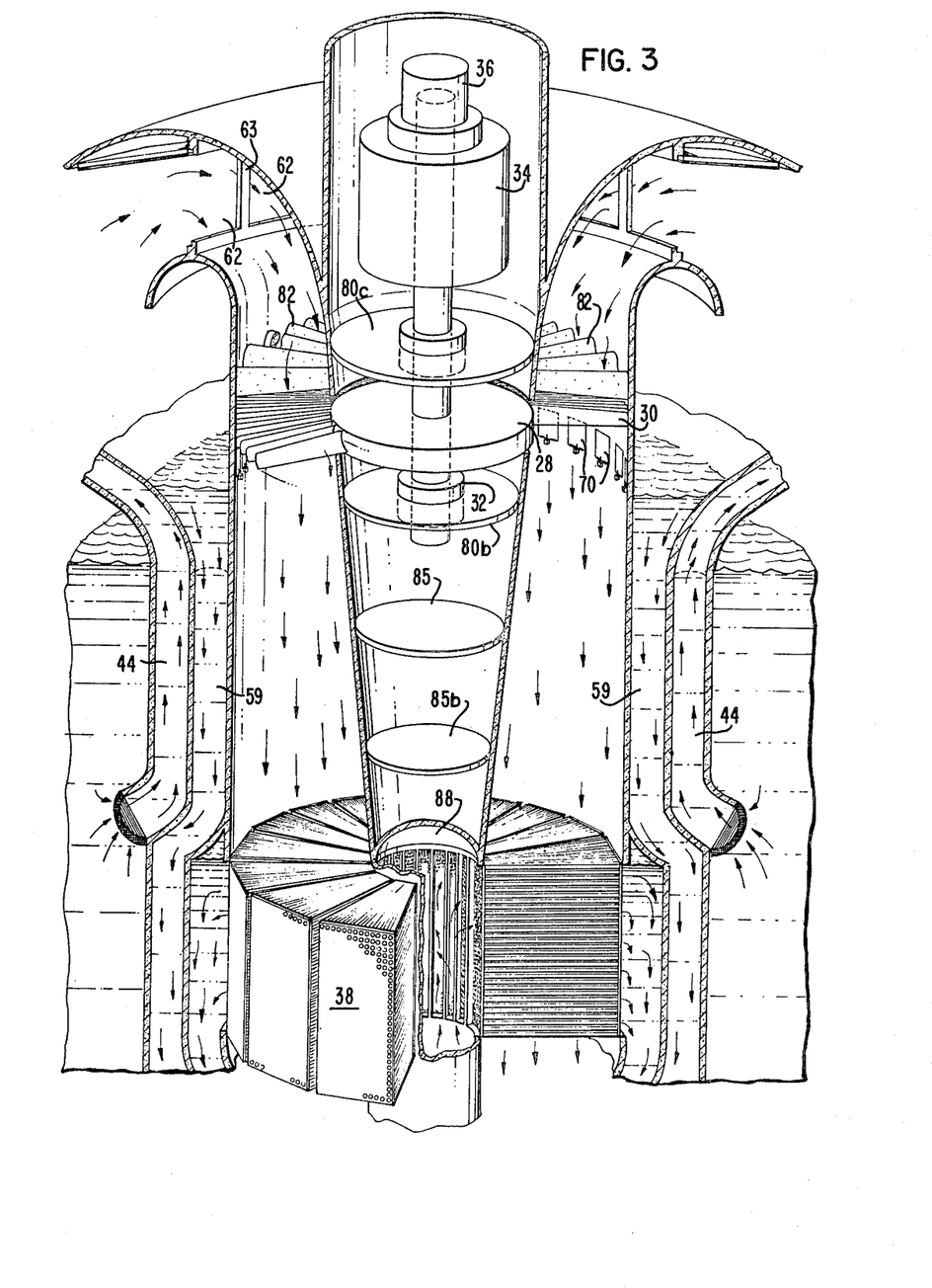
FIG. 3 is a cutaway pictorial illustration of the system shown sectioned in FIG. 2B.

FIG. 3 is a pictorial cutaway illustration of an inner portion of the system structure shown in FIG. 2B. The bypass control doors 74 illustrated in FIG. 3 are hinged along their bottom rather than their top as shown in FIG. 5B. Both bypass control door embodiments are functionally acceptable to accomplish proper transmission of bypass steam flow.

System structure 10 generally has a toroidal portion near its top and a cylindrical portion extending down therefrom so as to compositely resemble a mushroom. The toroidal evaporator casing 20 and generally cylindrical skirt-conduit/turbine casing 58 were chosen and assembled to provide a composite structural shape which is a compromise between conventionally constructed equipment casings and the vessel of minimum wall thickness—a sphere. Vertical, cylindrical bulkheads 101 and 102 are radially separated and circumferentially disposed about axis 22 above toroidal casing 20 and turbine inlet structure 79. Annular decks 103 are horizontally disposed between the bulkheads to provide rooms for housing the OTEC structure's crew and equipment control facilities. Access cover 104 disposed across the circular space bounded by bulkhead 102 can be removed by crane 16 to facilitate repair and/or maintenance of equipment components such as turbine 24, generator 34, and exciter 36. A judicious material choice for the complexly shaped system structure 10 such as prestressed concrete permits elimination of the conventional ship, hull or platform which was heretofore considered an expensive component of the open cycle OTEC system.

It will now be apparent that an improved OTEC open cycle power system has been provided in which the power cycle's component equipment casings structurally cooperate to simultaneously function as a hull structure. The equipment casing's structural and functional cooperation has reduced total plant capital cost for the exemplary 100 MWE system to $1500 per net KW electrical output. While the illustrated system is described as producing net electrical output and distilled water as a valuable byproduct, it is to be understood that component equipment size can be reduced to provide zero net electrical output if water production alone is to be economically maximized for a given system structure.

I claim:

1. An open cycle, ocean thermal energy conversion system comprising:

an axial flow turbine having a substantially vertical rotatable shaft about which at least one axial row of radial blades is disposed, an annular steam inlet structure through which motive steam is supplied to said turbine blades, and a steam outlet structure through which motive steam is exhausted after expansion through said blades;

a flash evaporator disposed about the turbine's shaft, said evaporator having a generally toroidal-shaped casing, an inlet opening in a radially outer portion of said casing through which relatively warm ocean water is received, a portion of said warm ocean water being flashed into steam and transmitted through said turbine steam inlet structure, the unflashed warm ocean water being drained from said evaporator casing through a drain outlet disposed in a radially inner portion of said casing, said water assuming a substantially radial flow direction from the inlet to the outlet;

a substantially annular condenser disposed axially adjacent said turbine about said turbine's axis of rotation, said condenser including radially inner and outer tube sheets, a plurality of tubes extending therebetween, a condensate sump disposed under said tubes for collection of condensed motive steam, and an outlet manifold, said inner tube sheets and said steam outlet structure cooperating to form an inlet manifold for distributing relatively cold ocean cooling water to the tubes, said cooling water traversing the tubes and exiting therefrom into the outlet manifold disposed radially adjacent said outer tube sheets;

a generator driven by said turbine for producing electrical energy;

first propulsion means for circulating relatively warm ocean water through said evaporator's inlet opening and drain outlet; and second propulsion means for circulating the cooling water through said condenser's inlet and outlet manifolds.

2. The system of claim 1 further comprising:

a first skirt structure extending circumferentially about said axis of rotation and axially between said evaporator and the ocean, said skirt including a conduit providing fluid communication between said evaporator inlet opening and the ocean for supplying warm ocean water to the evaporator.

3. The system of claim 2 further comprising:

a second skirt structure circumferentially disposed about said axis of rotation radially within said first skirt and extending axially between said evaporator and the ocean, said second skirt including a conduit providing fluid communication between said evaporator drain outlet and the ocean for conducting unflashed warm ocean water from the evaporator to the ocean.

4. The system of claim 3, whereby said first propulsion means is disposed in said second skirt structure's conduit.

5. The system of claim 3, said second structural skirt structure further comprising:

a channel providing fluid communication between said condenser outlet manifold and the ocean for returning the heat laden, cooling water to the ocean.

6. The system of claim 1, further comprising: a substantially vertical supply conduit extending a predetermined distance into the ocean for providing cold ocean water to the condenser's inlet manifold.

7. The system of claim 6 wherein said second propulsion means is disposed in said supply conduit.

8. The system of claim 1, said steam outlet structure comprising:

a diffuser disposed axially between said turbine blades and said condenser said diffuser slowing the exhausting steam prior to its entry into the condenser and constituting a surface which tapers downwardly radially inwardly.

9. The system of claim 1, said evaporator further comprising:

a weir structure separated from and circumferentially disposed about said axis of rotation within said evaporator casing, said weir structure including an upwardly extending weir which receives relatively warm ocean water along its radially outer side through said inlet opening and circumferentially, uniformly distributes that water to promote even, radially inward flow thereof over said weir; and a tray structure for receiving and maximizing the free surface area of the water distributed by said weir said tray structure including a plurality of trays slanted radially inwardly, downwardly, said trays having their radially outer edge disposed against said weir.

10. The system of claim 9, said evaporator further comprising:

a stepped demister structure for removing water droplets from the flashed steam, said demister structure constituting a plurality of connected annular mesh members, whose radially inner members are lower than the radially outer members.

11. The system of claim 9 wherein said trays are axially separated to provide at least two levels, said upper level trays being circumferentially separated, said lower level extending under said upper level trays and circumferentially overlapping therewith.

12. An open cycle, ocean thermal energy conversion system comprising:

an axial flow turbine having a rotatable shaft about which at least one axial row of radial blades is disposed, a steam inlet structure through which motive steam is supplied to said turbine blades, and a steam outlet structure through which motive steam is exhausted after expansion blades;

a flash evaporator disposed about the turbine's shaft, said evaporator having a generally toroidal shaped casing, said casing having an inlet opening in a radially outer portion thereof through which relatively warm ocean water is received, a portion of said warm ocean water being flashed into steam and transmitted through said steam turbine inlet structure, the unflashed warm ocean water being drained from said evaporator casing through a drain outlet disposed in a radially inner portion of said casing, said water assuming a substantially radial flow direction from the inlet to the outlet;

a substantially annular condenser disposed axially adjacent said turbine about said turbine's axis of rotation, said condenser including axially upper and lower tube sheets, a plurality of tubes vertically extending therebetween, and a condensate sump disposed under said lower tube sheets for collection of condensed motive steam, said tubes providing fluid communication between said steam outlet structure and said condensate sump, said condenser having an inlet manifold for radially distributing relatively cold ocean cooling water across the shell side of said tubes to a radially outer outlet manifold;

a generator driven by said turbine for producing electrical energy;

first propulsion means for circulating relatively warm ocean water through said evaporator's inlet opening and drain outlet; and second propulsion means for circulating the cooling water through said condenser's inlet and outlet manifolds.

13. The system of claim 12 further comprising:
a first skirt structure extending circumferentially about said axis of rotation and axially between said evaporator and the ocean, said skirt including a conduit for providing fluid communication between said evaporator inlet opening and the ocean for supplying warm ocean water to the evaporator.

14. The system of claim 13 further comprising:
a second skirt structure circumferentially disposed about said axis of rotation radially within said first skirt and extending axially between said evaporator and the ocean, said second skirt including a conduit providing fluid communication between said evaporator drain outlet and the ocean for conducting unflashed warm ocean water from the evaporator to the ocean.

15. The system of claim 14 wherein said first propulsion means is disposed in said second skirt structure's conduit.

16. The system of claim 14, said second skirt further structure comprising:

a channel providing fluid communication between said condenser outlet manifold and the ocean for returning the heat laden, cooling water to the ocean.

17. The system of claim 12, further comprising: a substantially vertical supply conduit extending a predetermined distance into the ocean for providing relatively cold ocean water to the condenser's manifold.

18. The system of claim 17 wherein said second propulsion means is disposed in said supply conduit.

19. The system of claim 12, said steam outlet structure comprising:
a diffuser disposed axially between said turbine blades and said condenser, said diffuser slowing the exhausting steam prior to its entry into the condenser tubes and constituting a surface which tapers downwardly and radially inwardly.

20. The system of claim 12, said evaporator further comprising:
a weir structure separated from and circumferentially disposed about said axis of rotation within said evaporator casing, said weir structure including an upwardly extending weir which receives relatively warm ocean water along its radially outer side through said inlet opening and circumferentially, uniformly distributes that water to promote even, radially inward flow thereof over said weir; and
a tray structure for receiving and maximizing the free surface area of the water distributed by said weir, said tray structure including a plurality of trays slanted radially inwardly, downwardly, said trays having their radially outer edge disposed against said weir.

21. The system of claim 20, said evaporator further comprising:
a stepped demister structure for removing water droplets from the flashed steam, said demister structure constituting a plurality of connected annular mesh members whose radially inner members are lower than the radially outer members.

22. The system of claim 20 wherein said trays are axially separated to provide at least two levels, said upper level trays being circumferentially separated, said lower level extending under said upper level trays and circumferentially overlapping therewith.

* * * * *